United States Patent [19]

Sugimoto et al.

[11] Patent Number: 5,026,331
[45] Date of Patent: Jun. 25, 1991

[54] ROCKER JOINT PIN TYPE CVT CHAIN

[75] Inventors: Yoshiaki Sugimoto; Toshihiro Hosokawa; Yutaka Uchiumi, all of Saitama; Shuji Sasamoto, Osaka; Nobuyuki Fujimoto, Saitama, all of Japan

[73] Assignee: Tsubakimoto Chain Co., Japan

[21] Appl. No.: 509,465

[22] Filed: Apr. 12, 1990

[30] Foreign Application Priority Data

May 26, 1989 [JP] Japan .................... 1-60315[U]

[51] Int. Cl.$^5$ .................................... F16G 13/02
[52] U.S. Cl. .................... 474/214; 474/215; 474/245
[58] Field of Search ........ 474/156, 157, 206, 214–219, 474/240–245

[56] References Cited

U.S. PATENT DOCUMENTS

| 2,725,755 | 12/1955 | Riopelle et al. | 474/157 |
| 4,507,106 | 3/1985 | Cole, Jr. | 474/215 |
| 4,801,289 | 1/1989 | Sugimoto et al. | 474/215 |
| 4,878,887 | 11/1989 | Sakakibara et al. | 474/245 |
| 4,904,231 | 2/1990 | Zimmer | 474/214 |

Primary Examiner—Thuy M. Bui
Attorney, Agent, or Firm—Eckert Seamans Cherin & Mellott

[57] ABSTRACT

An improved rocker joint pin type CVT chain has link plates connected by rocker joints, each including a rocker pin and a seat pin in an insertion bore of the link plate, the rocker pin and the seat pin making rolling contact along opposing rolling arcuate surfaces thereof as the chain bends and straightens when passing around a pulley. At respective minimums, the sectional area of the link plate formed between the link plate insertion bore and the outer periphery of the link plate relative to the pulley, is greater than the sectional area formed between the link plate insertion bore and the inner periphery. The radii of curvature of the inner rolling contact surfaces of the rocker pin and seat pin are smaller than those of the outer rolling contact surfaces. The fatigue strength at the minimum sectional area portions is thereby increased and the deviation from the chain center line of the contact point of the opposing rolling contact surfaces is minimized in a straightened position of the chain, thereby reducing the load applied to the inner minimum sectional area portion.

5 Claims, 4 Drawing Sheets

ROCKER JOINT PIN TYPE CVT CHAIN

BACKGROUND OF THE INVENTION

1. Field of the Invention

This invention relates to a continuously variable transmission (CVT) chain having link plates connected by rocker joints, a rocker pin and a seat pin being received in an insertion bore in the link plate and bearing against one another along arcuate contact surfaces. More particularly the invention relates to such a chain wherein a minimum sectional area of the link plate formed between the link plate insertion bore and the outer periphery of the link plate relative to the pulley, is greater than the sectional area formed between the link plate insertion bore and the inner periphery, and the radii of curvature of the inner rolling contact surfaces of the rocker pin and seat pin are smaller than those of the outer rolling contact surfaces.

2. Prior Art

A continuously variable transmission is generally composed of a pair of pulleys mounted on a driving shaft and a driven shaft, respectively. A plurality of frictionally driven blocks, mounted on an endless chain, are entrained on said pulleys. The pulleys have opposing conical surfaces for receiving the friction blocks of the chain. The conical surfaces of one or both pulleys can be varied in their spacing to adjust the effective diameter of the pulley. When the distance between the respective conical surfaces of either or both pulleys is changed, the distance from the axis of the pulley to the contact position of the frictionally driven blocks also changes, thereby changing the effective diameter of the pulley. The resulting structure is commonly referred to as a "continuously variable transmission" or CVT, because the spacing of the conical surfaces can be adjusted to any point in a continuous range.

The present invention relates to a rocker joint pin type CVT chain, which may be a "dual row" type or a "single row" type. The blocks are mounted on link plates connected by rocker joints having two pins that bear against one another along arcuate surfaces.

FIG. 1 illustrates a single row type CVT chain of the rocker joint pin type, in which a plurality of link plates L1, L2 are endlessly connected by means of a plurality of rocker joint pins P so as to form an endless transmission chain C. A plurality of frictionally driven blocks B are mounted to the link plates, in the illustrated case surrounding the link plates in positions between the successive connecting pins P. The V-shaped inclined surfaces T, T of the blocks B frictionally engage with the conical surfaces of the pulleys (not shown) so as to form the continuously variable transmission.

In a known rocker joint chain of this type, as shown in FIG. 3a, two connecting pins P1, P2 together form a rocker joint pin and bear against one another at points A, A'. When the chain is positioned such that the links are straight in line, the contact points A, A' of circular opposing rolling surfaces A1, A2 of the two connecting pins P1, P2 are located beneath the line N-N defined by connecting the centers of the insertion bores H, H of the rocker joint pins (i.e., internally of line N-N relative to the route of the endless chain around its pulleys). The contact points A, A' move upwardly from the center line N-N (i.e., outwardly of the chain route) with flexing of the connections of the link plates, as shown in FIG. 3b.

Consequently, with flexing of the chain, compression force is applied to the link plate inside of the center line N-N, and tensile force is applied to the link plate outside of the center line N-N, respectively.

A more detailed explanation can be made with reference to FIG. 3c. A tensile force F1 acts at the contact point A of the connecting pins at one joint; and a tensile force F2 acts at the contact point A' in the opposite direction at the other joint as the successive chain links draw one another along the chain route. Said tensile forces F1 and F2 are shown as tensile force components $Ft_1$ and $-Ft_2$, aligned parallel to the center line N-N; and bending moment components $Fb_1$ and $Fb_2$ acting inwardly as the chain passes around the pulley. Within the material of the link plate L, compression takes place inside of the center line N-N relative to the pulley; and tension takes place outside of the center line N-N due to the tensile component forces $Ft_1$ and $Ft_2$ as well as the bending moment forces.

A greater tensile force acts at the minimum sectional area portion D disposed between the pin insertion bore and the outer periphery of the link plate L than at the minimum sectional area portion D' between the pin insertion bore and the internal periphery of the link plate L.

Nevertheless, if the link plates L in the chain C are ordinary link plates, said two minimum sectional area portions D, D' have the same sectional areas. Hence, cracking is likely to occur sooner at the outer minimum sectional area portion D, where the forces are greater.

Furthermore, as mentioned before, the contact points A, A' of the opposing rolling contact surfaces A1 and A2 of the pins P1 and P2 move from the position shown in FIG. 3a, where the links are straight in line, to a flexed position shown in FIG. 3b as result of the angular displacement of successive links with flexing of the chain C. In a conventional CVT chain, the opposing rolling contact surfaces A1 and A2 are composed of arcuate surfaces having a uniform radius of curvature, i.e., defining an arc of a circle; and consequently, when the chain is in a straightened position as shown in FIG. 3a, the contact points A, A' are situated inwardly of the center line N-N by an amount $E_l$. As a result, when the chain is straight, the tensile load is shifted partially to the inner minimum sectional area portions D', D', which causes the strength of said portions to decrease.

It would be desirable in a CVT chain of the present type to arrange the links and the connecting pins so that loads applied to the chain link plates are more nearly equalized. In this manner, the chain can withstand greater loads per unit of chain weight, and longer wear.

SUMMARY OF THE INVENTION

It is an aspect of the invention to solve the above-mentioned problems of the prior art by improving on known structures of CVT chains. In a rocker joint pin type CVT chain having a plurality of link plates connected endlessly by means of rocker joint pins, each comprising a rocker pin and a seat pin adapted to make rolling contact by means of a pair of opposing rolling arcuate surfaces, the invention provides an improvement in that the minimum sectional area formed between the link plate insertion bore and the outer periphery of the link plate is greater than the minimum sectional area formed between the link plate insertion bore and the inner periphery of the link plate. In addition, the radii of curvature of the inner rolling contact surfaces are smaller than those of the outer rolling contact surfaces.

As mentioned before, when the chain is flexed, bending moment forces act on the link plates, namely tensile force Ft₁ and Ft₂, as do tensile forces. Therefore, by making the minimum sectional area formed between the link plate insertion bore and the outer periphery of the link plate is greater than the minimum sectional area formed between the link plate insertion bore and the inner periphery of the link plate, the fatigue strength at said minimum sectional area portions is increased. Furthermore, by making the radii of curvature of the inner rolling contact surfaces smaller than those of the outer rolling contact surfaces, the deviation of the contact points of the opposing rolling contact surfaces relative to the center line N—N is minimized when the chain links are oriented straight in line, thereby reducing the load applied to the inner minimum sectional area portions.

A primary use of the CVT chain is for an automatic transmission of a vehicle, where a relatively small chain with small link plates is desirable, but the torque to be transmitted is extremely large. The present invention provides a CVT chain having substantially increased fatigue strength owing to the above-mentioned structure, and operates well in such demanding applications.

BRIEF DESCRIPTION OF THE DRAWINGS

There are shown in the drawings the embodiments of the invention as presently preferred. It should be understood that the invention is not limited to the precise arrangements and instrumentalities shown in the exemplary embodiments, wherein.

DETAILED DESCRIPTION OF THE PREFERRED EMBODIMENTS

Figure 1:
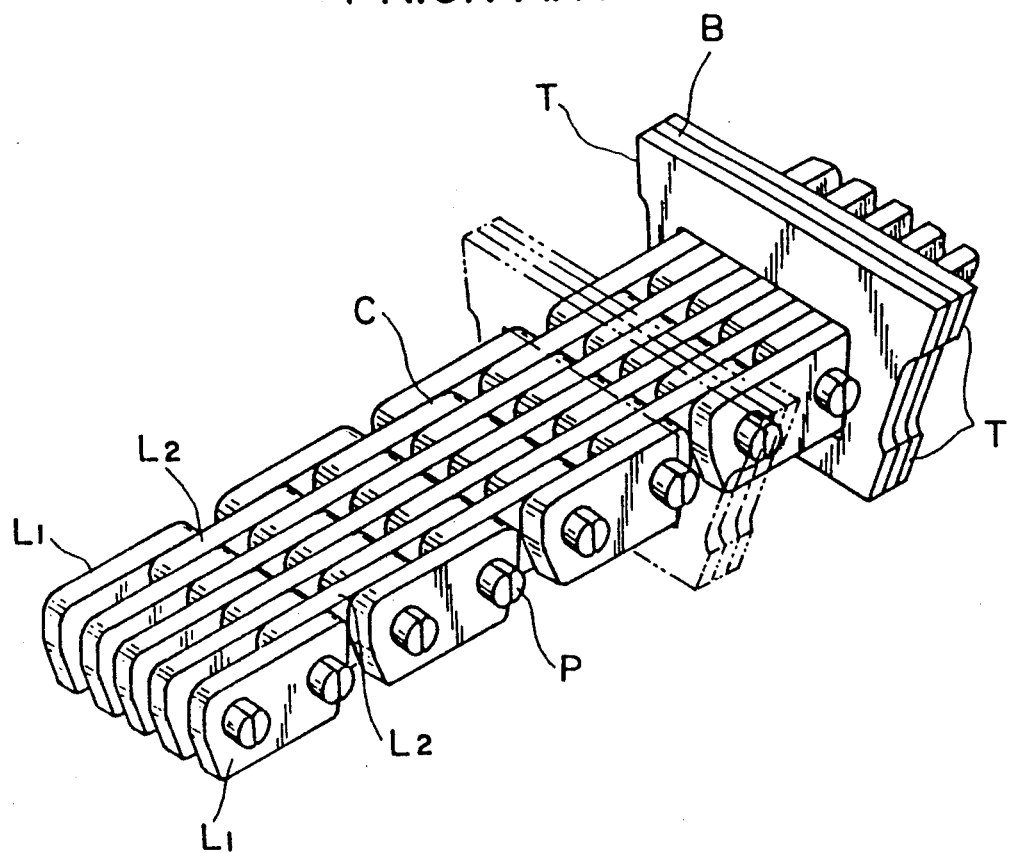
FIG. 1 shows a perspective view of a continuously variable transmission chain of the rocker joint pin type.
Figure 2:
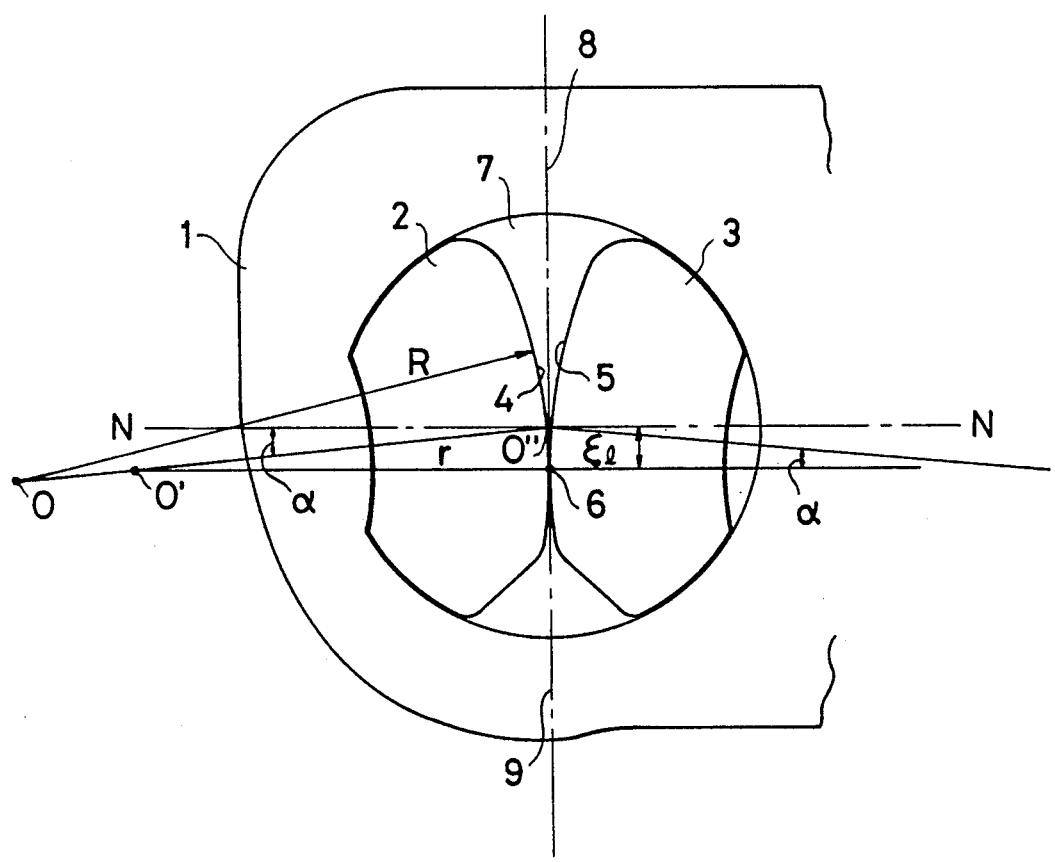
FIG. 2 is an enlarged elevation of a link plate of the chain according to the present invention.

As shown in FIG. 2, a rocker pin joint according to the invention comprises a rocker pin 2 and a seat pin 3, inserted into a bore 7 formed in a link plate 1. A plurality of the link plates may be arranged in alternating configuration across the width of the chain. The respective contact surfaces 4 and 5 of the rocker pin 2 and seat pin 3 come into contact at one point 6. When the chain is in a straight tensioned state, the contact point is located inwardly of the center line N—N (below the center line in FIG. 2) by the distance $E_l$. When the chain is flexed so as to pass around a pulley, the rolling or contact surface 5 of the seat pin 3 and the rolling or contact surface 4 of the rocker pin 2 roll over one another in contact. Thus the contact point between surfaces 4, 5 moves outwardly (or upwardly in FIG. 2) of the center line N—N.

Within the span of rolling contact, the radius of curvature r of the lower half of the rolling surfaces 4 and 5 is smaller than the radius of curvature R of the upper half of the rolling surfaces 4 and 5. Therefore, the amount of deviation of the contact point $E_l$ between surfaces 4, 5 (as above defined) is relatively smaller, since said amount is calculated as follows:

$$r \tan \alpha = E_l$$

where $\alpha$ is the angle of inclination of successive links with respect to the center line N—N. In other words, as shown in FIG. 2, point 0 (the center of the larger radius R), 0' (center of the smaller radius r) and the point 0" (center of the bore 7) are situated on the same line, which is inclined by the angle $\alpha$ relative to the center line N—N.

Figure 3A:
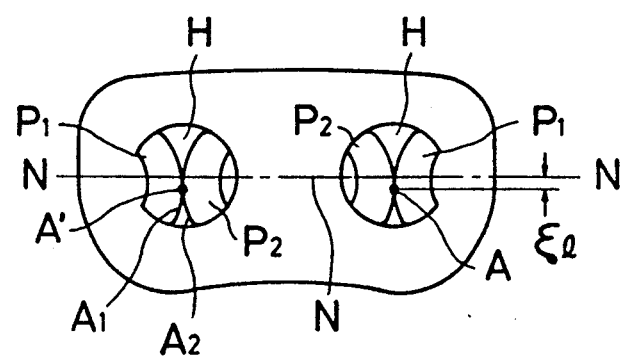
FIG. 3a is an elevation of a link plate of a conventional prior art CVT chain having connecting pins in a straightened position of the chain.
Figure 3B:
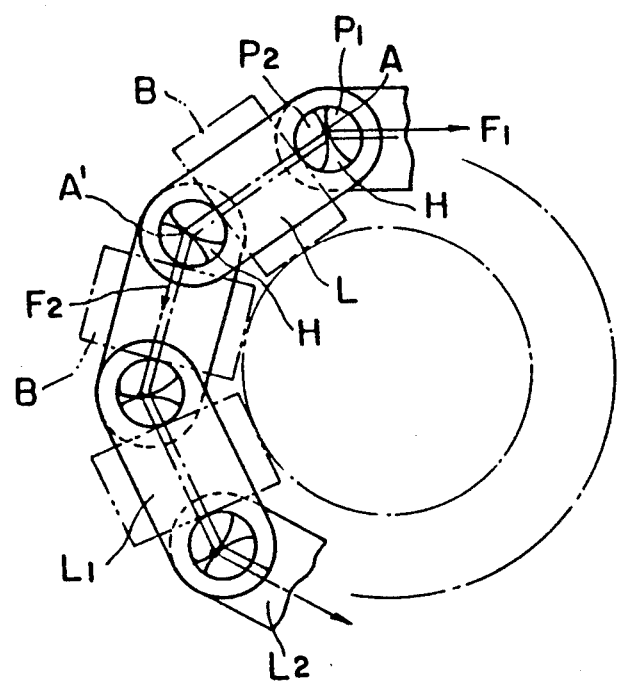
FIG. 3b is an elevation of the chain when the chain of FIG. 3a is entrained by a pulley; and, FIG. 3c is an enlarged elevation of one of the link plates in FIG. 3b.
Figure 3C:
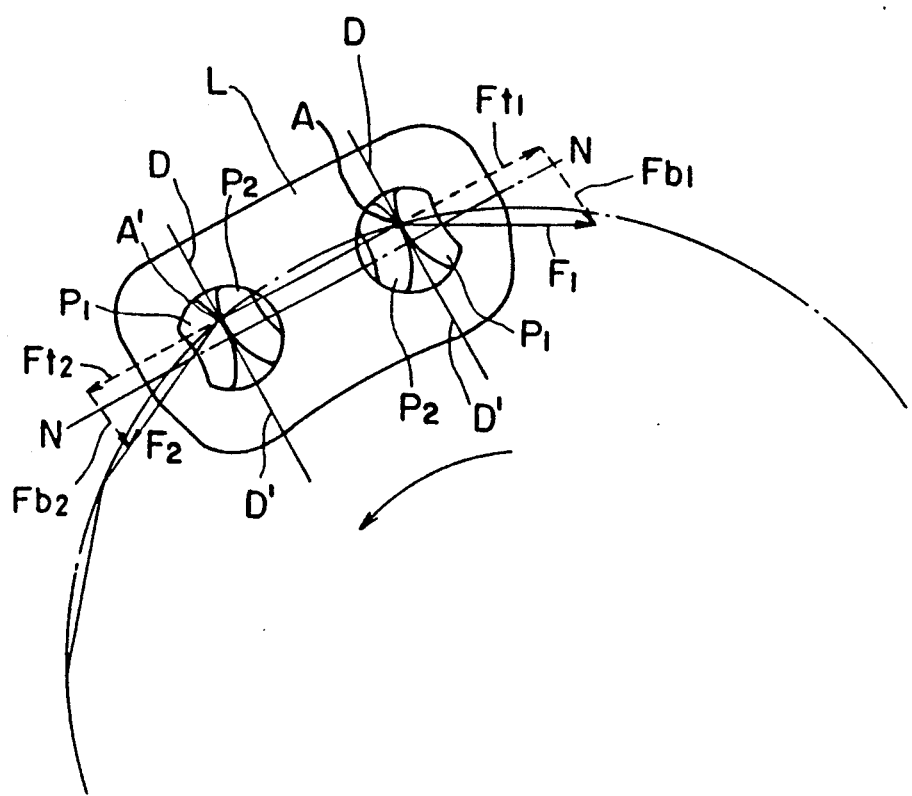

When the chain is flexed as shown in FIG. 3c, a tensile load due to a bending moment of force is applied to the minimum sectional area portion 8 between the bore 7 and the outer periphery of the link plate 1. In addition tensile loads Ft₁ and Ft₂ are applied due to the linear tension of the chain. In order to strengthen minimum section area 8 against the load, said minimum sectional area portion 8 is made larger than the counterpart minimum sectional area portion 9 formed between the bore 7 and the inner periphery of the link plate 1. This improves the fatigue strength of section 8, and the strength of the chain as a whole.

The invention having been disclosed, variations on the subject matter will occur to persons skilled in the art. Reference should be made to the appended claims rather than the foregoing specification in order to assess the scope of the invention in which exclusive rights are claimed.

We claim:

1. An improved rocker joint pin type CVT chain of a type having a plurality of link plates connected endlessly by means of rocker joint pins disposed within insertion bores in the link plates, the chain having lateral inclined surfaces for bearing against inclined peripheral flanges of a pulley, each of the rocker joint pins comprising a rocker pin and a seat pin in rolling contact at an opposing pair of arcuate contact surfaces of said rocker pin and said seat pin, the improvement comprising:

the link plate having a minimum cross-sectional area between the link plate insertion bore and an outer periphery of the link plate that is greater than a minimum cross-sectional area between the link plate insertion bore and an inner periphery of the link plate.

2. The improved CVT chain according to claim 1, wherein each of the arcuate contact surfaces of the rocker pin and the seat pin defines an upper surface portion which is above a horizontal center line of the insertion bore, and a lower surface portion which is below the horizontal center line of the insertion bore, the lower surface portions having smaller radii of curvature than the upper surface portions.

3. The improved CVT chain according to claim 2, wherein the smaller radii and the larger radii have centers disposed on a common line inclined at an angle relative to a center line of the link plate.

4. An improved rocker joint pin type CVT chain of a type having a plurality of link plates connected endlessly by means of rocker joint pins disposed within insertion bores in the link plates, the chain having lateral inclined surfaces for bearing against inclined peripheral flanges of a pulley, each of the rocker joint pins comprising a rocker pin and a seat pin in rolling contact at an opposing pair of arcuate contact surfaces of said rocker pin and said seat pin, the improvement comprising;

each of the arcuate contact surfaces of the rocker pin and the seat pin defines an upper surface portion which is above a horizontal center line of the insertion bore, and a lower surface portion which is below the horizontal center line of the insertion bore, the lower surface portions having smaller radii of curvature than the upper surface portions; wherein the smaller radii and the larger radii have centers disposed on a common line inclined at an angle relative to a center line of the link plate.

5. The improved CVT chain according to claim 4, wherein the link plate has a minimum cross-sectional area between the link plate insertion bore and an outer periphery of the link plate that is greater than a minimum cross-sectional area between the link plate insertion bore and an inner periphery of the link plate.

* * * * *